US012647525B2

(12) United States Patent
Sato et al.

(10) Patent No.: US 12,647,525 B2
(45) Date of Patent: Jun. 2, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD COMPRISING TO DISPLAY PROGRESS OF PROCESSING IN A CASE WHERE A SECOND USER HAVING A POSSIBILITY OF USING THE IMAGE FORMING APPARATUS IS DETECTED WHEN A FIRST USER IS OPERATING AN OPERATION PANEL

(71) Applicant: FUJIFILM Business Innovation Corp., Tokyo (JP)

(72) Inventors: Tatsuya Sato, Kanagawa (JP);
Teruyuki Naruse, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/986,825

(22) Filed: Nov. 14, 2022

(65) Prior Publication Data

US 2023/0412750 A1 Dec. 21, 2023

(30) Foreign Application Priority Data

Jun. 17, 2022 (JP) ................................. 2022-098383

(51) Int. Cl.
*H04N 1/23* (2006.01)
*H04N 1/00* (2006.01)
(52) U.S. Cl.
CPC ....... *H04N 1/2392* (2013.01); *H04N 1/00037* (2013.01); *H04N 1/00408* (2013.01); *H04N 1/00477* (2013.01)

(58) Field of Classification Search
CPC ........... H04N 1/00037; H04N 1/00408; H04N 1/00477; H04N 1/2392
USPC ......................................... 358/1.11–1.18, 1.1
See application file for complete search history.

(56) References Cited

U.S. PATENT DOCUMENTS

2006/0227374 A1* 10/2006 Tarumi ................... G06K 15/02
358/1.15
2012/0250059 A1* 10/2012 Itogawa ................ G06F 3/1204
358/1.14
2015/0049923 A1* 2/2015 Nobutani .............. G06F 21/608
382/118
(Continued)

FOREIGN PATENT DOCUMENTS

JP 2004280167 A * 10/2004
JP 2007072170 A * 3/2007
JP 2010004408 1/2010
(Continued)

OTHER PUBLICATIONS

Mitsutake (Year: 2007).*
(Continued)

*Primary Examiner* — Chad Dickerson
(74) *Attorney, Agent, or Firm* — JCIPRNET

(57) ABSTRACT

An information processing apparatus includes a processor configured to perform display corresponding to progress of processing accepted by an image forming apparatus only in a case where a second user having a possibility of using the image forming apparatus other than a first user who is operating an operation panel is detected.

13 Claims, 12 Drawing Sheets

(56)           References Cited

U.S. PATENT DOCUMENTS

2017/0127278 A1*  5/2017  Yamamoto ...... H04M 1/724631

FOREIGN PATENT DOCUMENTS

| JP | 2014147022 | 8/2014 |
| JP | 2015036918 | 2/2015 |
| JP | 2017080984 A | * | 5/2017 |

OTHER PUBLICATIONS

Hotate (Year: 2017).*
"Notice of Reasons for Refusal of Japan Counterpart Application
No. 2022-098383", issued on Feb. 10, 2026, with English transla-
tion thereof, p. 1-p. 6.

* cited by examiner

JOB 1        JOB 2

DISPLAY REGION a          DISPLAY REGION b

PROGRESS                EVENT WITH HIGH
DISPLAY                    PRIORITY

38

DISPLAY REGION b     DISPLAY REGION a     DISPLAY REGION b

EVENT WITH HIGH        PROGRESS        EVENT WITH HIGH
PRIORITY              DISPLAY            PRIORITY

38

INFORMATION PROCESSING APPARATUS, NON-TRANSITORY COMPUTER READABLE MEDIUM STORING INFORMATION PROCESSING PROGRAM, AND INFORMATION PROCESSING METHOD COMPRISING TO DISPLAY PROGRESS OF PROCESSING IN A CASE WHERE A SECOND USER HAVING A POSSIBILITY OF USING THE IMAGE FORMING APPARATUS IS DETECTED WHEN A FIRST USER IS OPERATING AN OPERATION PANEL

CROSS-REFERENCE TO RELATED APPLICATIONS

This application is based on and claims priority under 35 USC 119 from Japanese Patent Application No. 2022-098383 filed Jun. 17, 2022.

BACKGROUND

(i) Technical Field

The present disclosure relates to an information processing apparatus, a non-transitory computer readable medium storing an information processing program, and an information processing method.

(ii) Related Art

JP2010-4408A suggests an image forming apparatus in which, in a case where a job from a user terminal is received by job reception means, a user of a job transmission source is discriminated by user determination means, user display information indicating that the received job is a unique job of the discriminated user is acquired by acquisition means, a display form of the acquired user display information is changed in accordance with a content of the job, and the changed user display information is displayed on display means.

SUMMARY

There is a technology for displaying progress of use of a user to a user other than a user who is operating an image forming apparatus in a case where the user is using the image forming apparatus.

However, in a case where there are no users in the vicinity other than the user who is operating, display meaningless and useless for the user who is operating is performed.

Aspects of non-limiting embodiments of the present disclosure relate to an information processing apparatus, a non-transitory computer readable medium storing an information processing program, and an information processing method that can display progress only in a case where a user having a possibility of using an image forming apparatus is present.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform display corresponding to progress of processing accepted by an image forming apparatus only in a case where a second user having a possibility of using the image forming apparatus other than a first user who is operating an operation panel is detected.

BRIEF DESCRIPTION OF THE DRAWINGS

Exemplary embodiment(s) of the present invention will be described in detail based on the following figures, wherein.

DETAILED DESCRIPTION

Figure 1:
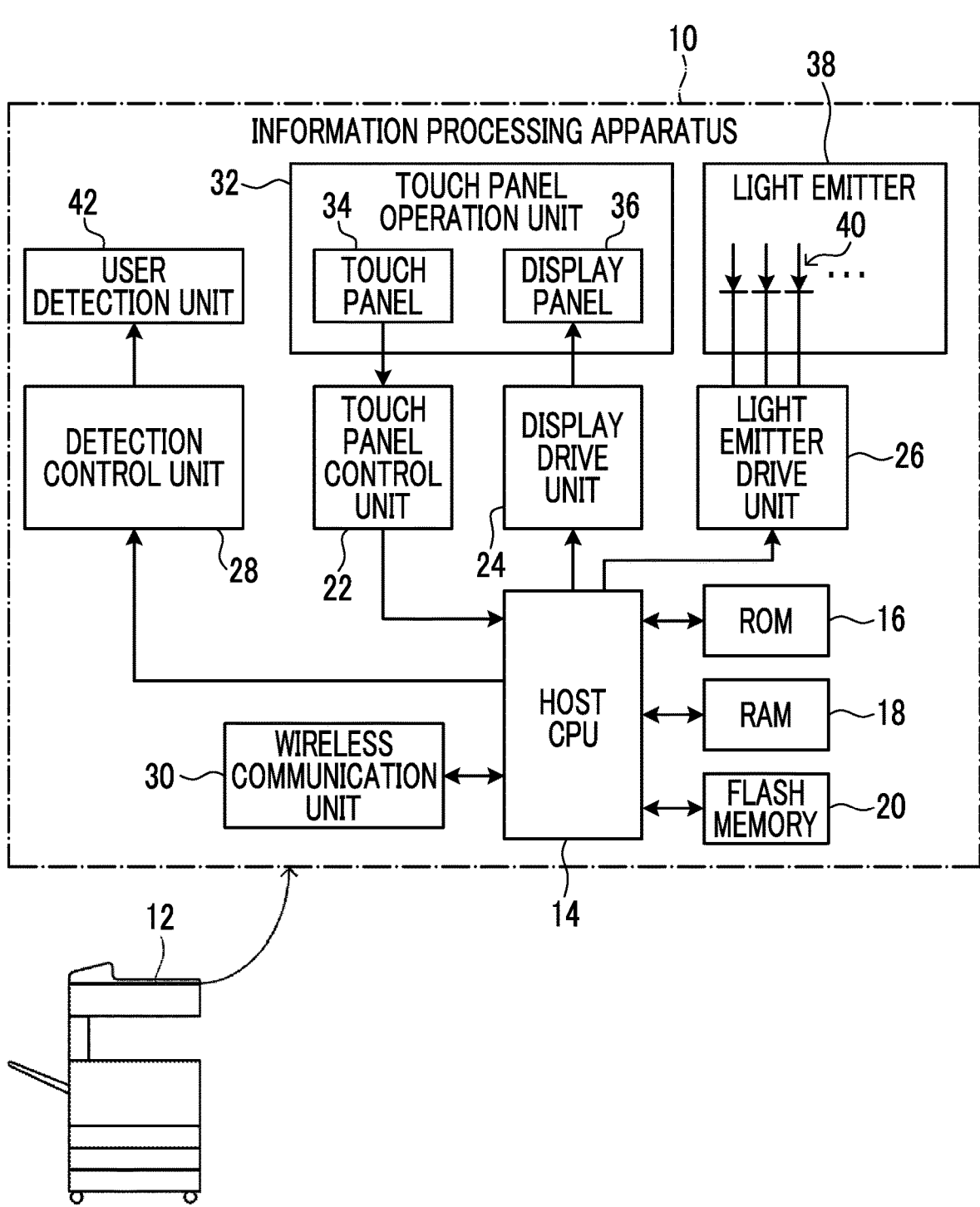
FIG. 1 is a block diagram illustrating a schematic configuration of an information processing apparatus according to the present exemplary embodiment.

Hereinafter, an example of an exemplary embodiment of the present disclosure will be described in detail with reference to the drawings. FIG. 1 is a block diagram illustrating a schematic configuration of an information processing apparatus according to the present exemplary embodiment.

In the present exemplary embodiment, an example in which an information processing apparatus 10 is provided in an image forming apparatus 12 having a plurality of functions will be described. The plurality of functions of the image forming apparatus 12 include, for example, an image forming function of receiving various kinds of data and performing image forming processing based on the received data, a scanning function of scanning a document to obtain image information representing the document, a copying function of copying the image recorded on the document onto a sheet, a facsimile function of transmitting and receiving various kinds of data via a telephone line (not illustrated), a transfer function of transferring document information such as image information scanned by the scanning function, and an accumulation function of accumulating the document information such as the scanned image information.

In the following description, a job is processing or a processing group executed by the image forming apparatus 12 to implement a predetermined function. In the following description, image formation by the image forming apparatus 12 may be referred to as printing.

The information processing apparatus 10 according to the present exemplary embodiment includes a host central processing unit (CPU) 14, a read only memory (ROM) 16, a random access memory (RAM) 18, and a flash memory 20, as illustrated in FIG. 1.

The host CPU 14 controls the overall operation of the apparatus. Various control programs, various parameters, and the like are stored in advance in the ROM 16. The RAM 18 is used as a work area or the like when various programs are executed by the host CPU 14. The flash memory 20 stores various kinds of data, application programs, and the like. The above components are electrically connected to each other by a system bus. In the present exemplary embodiment, although the flash memory 20 is used as a storage unit, the present disclosure is not limited thereto, and other non-volatile storage units such as a hard disk drive (HDD) may be applied.

A touch panel control unit 22, a display drive unit 24, a light emitter drive unit 26, a detection control unit 28, and a wireless communication unit 30 are connected to the host CPU 14.

The touch panel control unit 22 controls a touch panel 34 of a touch panel operation unit 32 as an example of an operation panel for operating the image forming apparatus 12 and detects an operation of a user on the touch panel 34. Although the touch panel 34 is described as an example of the operation panel in the present exemplary embodiment, the operation panel is not limited to the touch panel. For example, an operation panel including a display unit, operation switches, operation keys, and the like may be applied.

The display drive unit 24 drives display on a display panel 36 of a touch panel operation unit 32 and controls display on the display panel 36.

Figure 2:
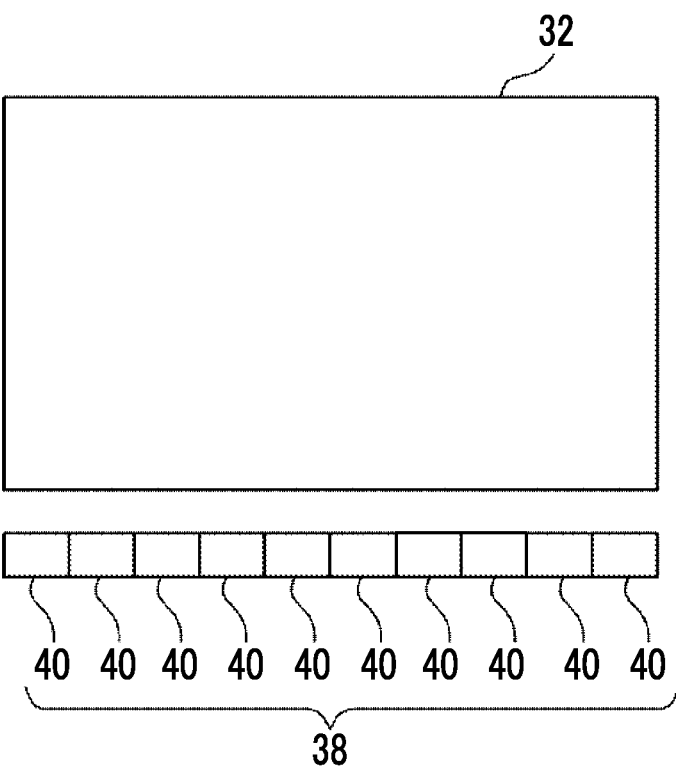
FIG. 2 is a diagram illustrating an example in which a light emitter is provided in the vicinity of a touch panel operation unit.
Figure 3:
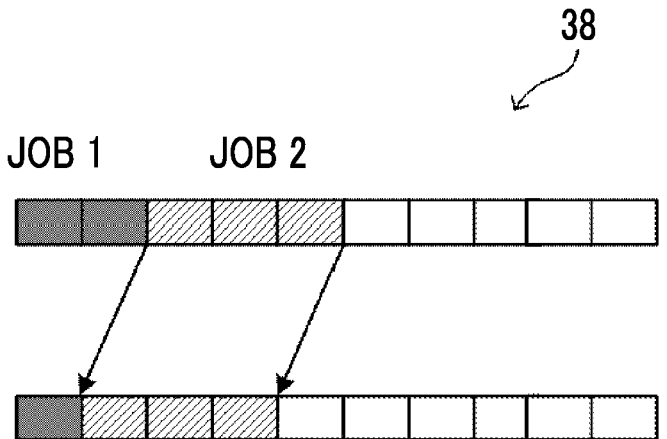
FIG. 3 is a diagram illustrating an example in which progress of processing received by the image forming apparatus is displayed by causing light-emitting units of the light emitter to emit light.

The light emitter drive unit 26 drives light emission of each light-emitting unit 40 of a light emitter 38 having light-emitting units 40 such as a plurality of light emitting diodes (LEDs), electroluminescence (EL), and light bulbs. In the present exemplary embodiment, as an example, the light emitter 38 is provided in the vicinity of the touch panel operation unit 32 as illustrated in FIG. 2, and causes the light-emitting units 40 to emit light. Thus, the progress of the image forming apparatus 12 is displayed. For example, FIG. 3 is an example in which the progress of processing received by the image forming apparatus 12 is displayed by causing the light-emitting units 40 of the light emitter 38 to emit light. In the example of FIG. 3, in a case where there are two jobs (Job 1 and Job 2), a job loaded first in a queue is displayed from the left. In this case, in order to indicate that there are two jobs, a display mode such as color is changed for each job. Time progresses in order from an upper part of FIG. 3 to a lower part of FIG. 3, and Job 1 is processed as time progresses. Accordingly, a display region of Job 1 is decreased, and thus, a waiting time is notified.

Figure 4:
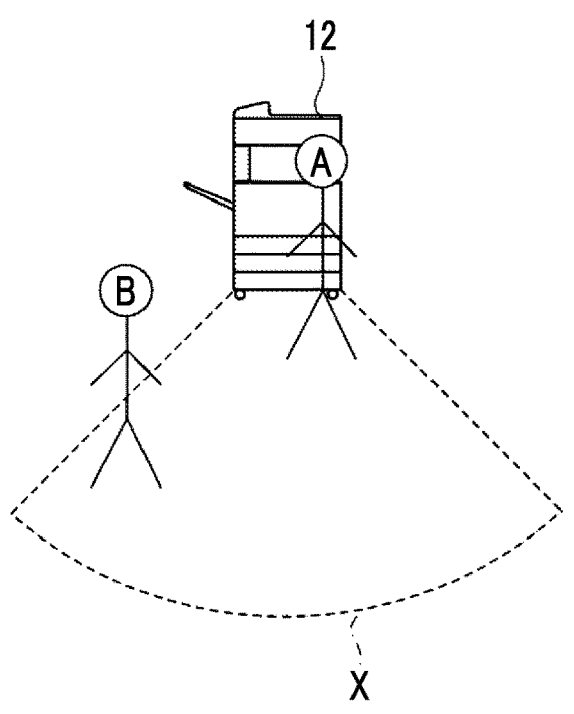
FIG. 4 is a diagram illustrating detection states of users of the image forming apparatus, and is a diagram illustrating an example in which a user detection unit detects a first user A who is operating and a second user B having a possibility of using an image forming apparatus 12 within a detection range.
Figure 5:
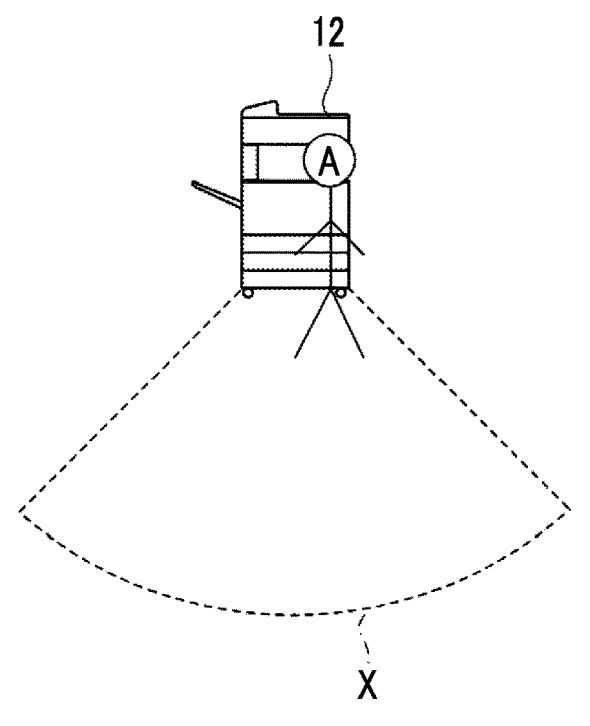
FIG. 5 is a diagram illustrating the detection states of the users of the image forming apparatus, and is a diagram illustrating an example in which the user detection unit detects only the first user A who is operating within the detection range.

The detection control unit 28 controls a user detection unit 42 as an example of a detection unit that detects whether a second user who may use the image forming apparatus 12 other than a user having a possibility of using the image forming apparatus 12 is in the vicinity of the image forming apparatus 12. The user detection unit 42 outputs a detection result to the host CPU 14. The user detection unit 42 detects a user of the image forming apparatus 12 within a predetermined detection range X, as illustrated in FIGS. 4 and 5. FIG. 4 is a diagram illustrating a detection state of the user of the image forming apparatus 12, and illustrates an example in which the user detection unit 42 detects a first user A who is operating within the detection range X and a second user B having a high possibility of using the image forming apparatus 12. FIG. 5 is a diagram illustrating the detection state of the user of the image forming apparatus 12, and illustrates an example in which the user detection unit 42 detects only the first user A who is operating within the detection range X. As an example of the user detection unit 42, for example, a motion detector or a sensor camera may be used to detect an approach of a person. Alternatively, an operation by a mobile terminal or an approach of the mobile terminal may be detected by short-range wireless communication such as Wi-Fi (registered trademark) or Bluetooth (registered trademark). Alternatively, the approach of the person may be detected by various sensors such as a voice recognition sensor, an infrared sensor, and a vibration sensor. The detection control unit 28 may not be necessarily provided in the image forming apparatus 12. For example, the existence of the second user having the possibility of using the image forming apparatus 12 by detecting the approach by a sensor or a camera disposed at a position different from the image forming apparatus 12 and sending this information to the image forming apparatus 12. Hereinafter, the second user having the possibility of using the image forming apparatus 12 other than the first user who is operating the image forming apparatus 12 may be referred to as a standby user.

The wireless communication unit 30 exchanges information by wireless communication between an external device such as a mobile terminal device carried by the user and the host CPU 14.

As described above, in the information processing apparatus 10 according to the present exemplary embodiment, the progress display of processing accepted by the image forming apparatus 12 is performed by causing the light emitters 38 to emit light. However, in a case where there is no standby user in the vicinity other than the user who is operating around, display meaningless and useless for the user who is operating is performed, and thus, there is a possibility of annoying the user who is operating.

Therefore, in the information processing apparatus 10 according to the present exemplary embodiment, only in a case where a standby user having a possibility of using the image forming apparatus 12 other than the user who is operating the image forming apparatus 12 is detected, the progress display of the image forming apparatus 12 is performed by causing the light emitter 38 to emit light, and thus, a waiting time is notified.

Figure 6:
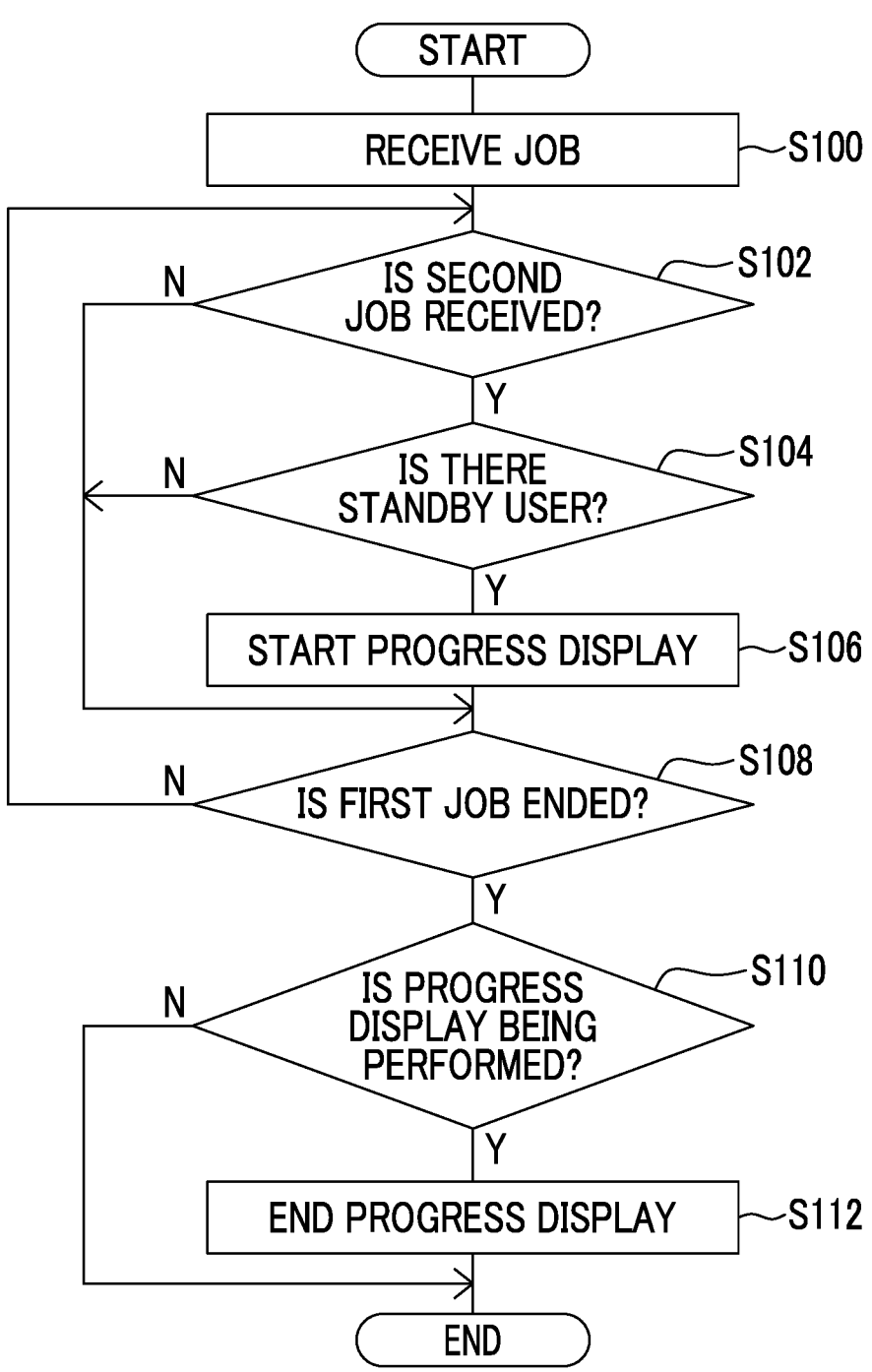
FIG. 6 is a flowchart illustrating an example of a flow of processing performed by the information processing apparatus according to the present exemplary embodiment.

Next, specific processing performed by the information processing apparatus 10 having the above-described configuration will be described. FIG. 6 is a flowchart illustrating an example of a flow of processing performed by the information processing apparatus 10 according to the present exemplary embodiment. The processing of FIG. 6 is started in a case where the user of the image forming apparatus 12 transmits a job.

In step S100, the host CPU 14 receives the job and proceeds to step S102.

In step S102, the host CPU 14 determines whether or not a second job is received. The host CPU proceeds to step S104 in a case where the determination is positive, and proceeds to step S108 in a case where the determination is negative.

In step S104, the host CPU 14 determines whether or not there is the standby user. This determination is performed by determining whether or not the user detection unit 42 detects a user other than the user who is operating the image forming apparatus 12. The host CPU proceeds to step S106 in a case where the determination is positive, and proceeds to step S108 in a case where the determination is negative.

In step S106, the host CPU 14 starts the progress display of the processing of the image forming apparatus 12 by controlling the light emitter drive unit 26 to cause the light emitter 38 to emit light, and proceeds to step S108. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

First Modification Example

Next, a first modification example of processing of performing the display by the light emitter 38 performed by the information processing apparatus 10 according to the present exemplary embodiment will be described.

In the first modification example, in a case where a light-emitting event of another light emitter 38 is detected while the progress display is being performed, a light-emitting event with a high priority is preferentially displayed.

Figure 7:
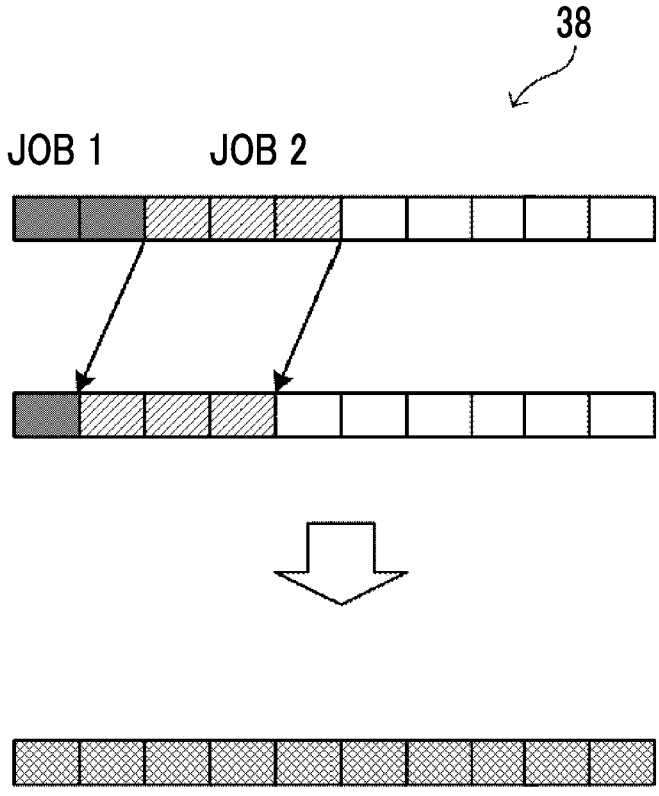
FIG. 7 is a diagram illustrating that a display state of the light emitter changes in accordance with a priority of a light-emitting event detected by the image forming apparatus.
Figure 7:

FIG. 7 is a diagram illustrating a case where a display state of the light emitter 38 changes in accordance with a priority of the light-emitting event detected by the image forming apparatus 12.

As illustrated in an upper part of FIG. 7, even though progress information of the job is displayed by the light emitter 38, in a case where another light-emitting event with a higher priority is detected, as illustrated in a lower part of FIG. 7, the display of the progress information is stopped and another light-emitting event is preferentially displayed. For example, another light-emitting event with a high priority is displayed in a predetermined display mode such as color representing error information or the like or a blinking method.

Figure 8:
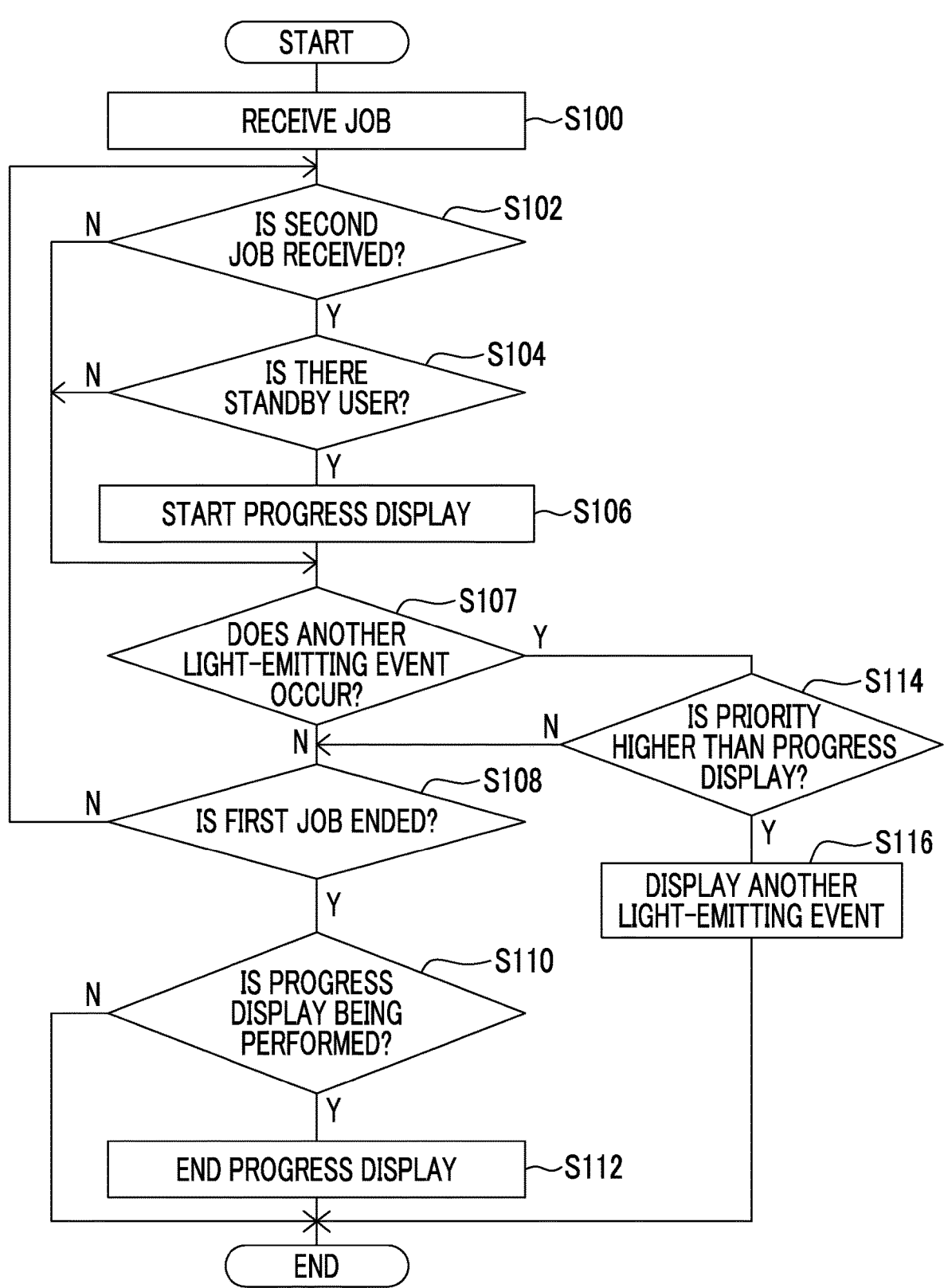
FIG. 8 is a flowchart illustrating an example of a flow of processing performed by the information processing apparatus in a first modification example.

FIG. 8 is a flowchart illustrating an example of a flow of processing performed by the information processing apparatus 10 in the first modification example. The processing of FIG. 8 is started in a case where the user of the image forming apparatus 12 transmits a job. The processing identical to the processing of FIG. 6 will be described with the identical reference numeral.

In step S100, the host CPU 14 receives the job and proceeds to step S102.

In step S102, the host CPU 14 determines whether or not a second job is received. The host CPU proceeds to step S104 in a case where the determination is positive, and proceeds to step S107 in a case where the determination is negative.

In step S104, the host CPU 14 determines whether or not there is the standby user. This determination is performed by acquiring the detection result of the user detection unit 42 and determining whether or not a user other than the user who is operating the image forming apparatus 12 is detected. The host CPU proceeds to step S106 in a case where the determination is positive, and proceeds to step S107 in a case where the determination is negative.

In step S106, the host CPU 14 starts the progress display of the processing of the image forming apparatus 12 by controlling the light emitter drive unit 26 to cause the light emitter 38 to emit light, and proceeds to step S107. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S107, the host CPU 14 determines whether or not another light-emitting event occurs. The host CPU proceeds to step S108 in a case where the determination is negative, and proceeds to step S114 in a case where the determination is positive.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

On the other hand, in step S114, the host CPU 14 determines whether or not the occurred another light-emitting event has a higher priority than the progress display. The host CPU proceeds to step S108 in a case where the determination is negative, and proceeds to step S116 in a case where the determination is positive.

In step S116, the host CPU 14 displays that another light-emitting event occurs by controlling the light emitter drive unit 26 to cause the light emitter 38 to emit light, and ends the series of processing. For example, the occurrence of another light-emitting event is notified by causing the light emitter 38 to emit light in a display mode such as a color or blinking that is different from the progress display.

Second Modification Example

Next, a second modification example of the processing of performing the display by the light emitter 38 performed by the information processing apparatus 10 according to the present exemplary embodiment will be described.

In the second modification example, a display region of the light emitter 38 is divided, and thus, the progress display and the light-emitting event with a high priority are displayed in parallel.

Figure 9:
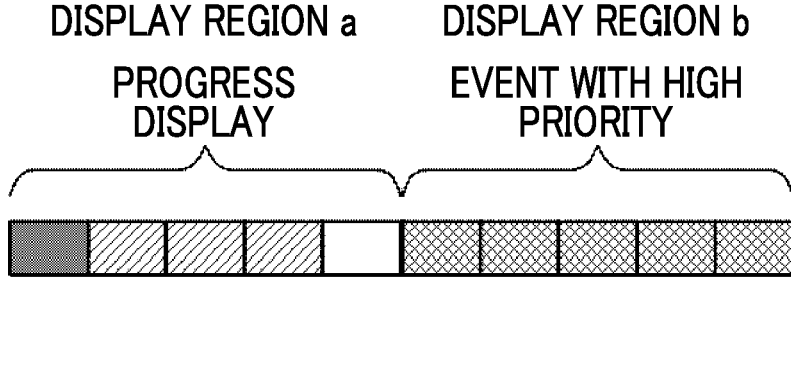
FIG. 9 is a diagram illustrating an example in which progress of received processing and another light-emitting event are displayed in parallel.

FIG. 9 is a diagram illustrating an example in which the progress of the received processing and another light-emitting event are displayed in parallel. In a case where the progress information of the job is being displayed, and in a case where another light-emitting event with a higher priority is detected, the display region is divided equally in the center and another light-emitting event is displayed in parallel with the display of the progress information. Positions to be displayed may be switched left and right. Accordingly, for example, in a case where a light-emitting event with a high priority such as an error occurs, another light-emitting event with a high priority even is easily recognized from a remote location while the progress information is displayed. In FIG. 9, although the progress display is illustrated on a left side and the event with a high priority are displayed on a right side, the left and right may be interchanged.

Figure 10:
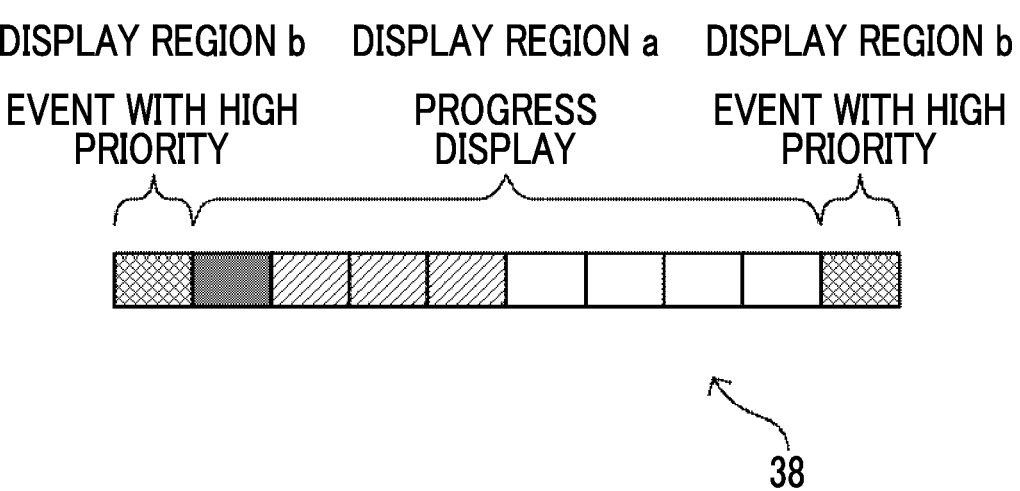
FIG. 10 is a diagram illustrating another example in which progress of received processing and another light-emitting event are displayed in parallel.

FIG. 10 is a diagram illustrating another example in which the progress of the received processing and another light-emitting event are displayed in parallel. In a case where the progress information of the job is being displayed, and in a case where another light-emitting event with a higher priority is detected, the progress information is displayed in a display region a, and another light-emitting event is displayed in a display region b. Accordingly, the present exemplary embodiment is effective in a case where there is an attempt to display the progress information while the information of the light-emitting event is displayed in a case where another light-emitting event occurs.

In a case where another light-emitting event occurs during the progress display, the display region may be divided to display another light-emitting event together with the progress display regardless of the priority. For example, in a case where additional information is displayed in addition to the progress display, the display region may be divided to perform the progress display and the display of the additional information.

Figure 11:
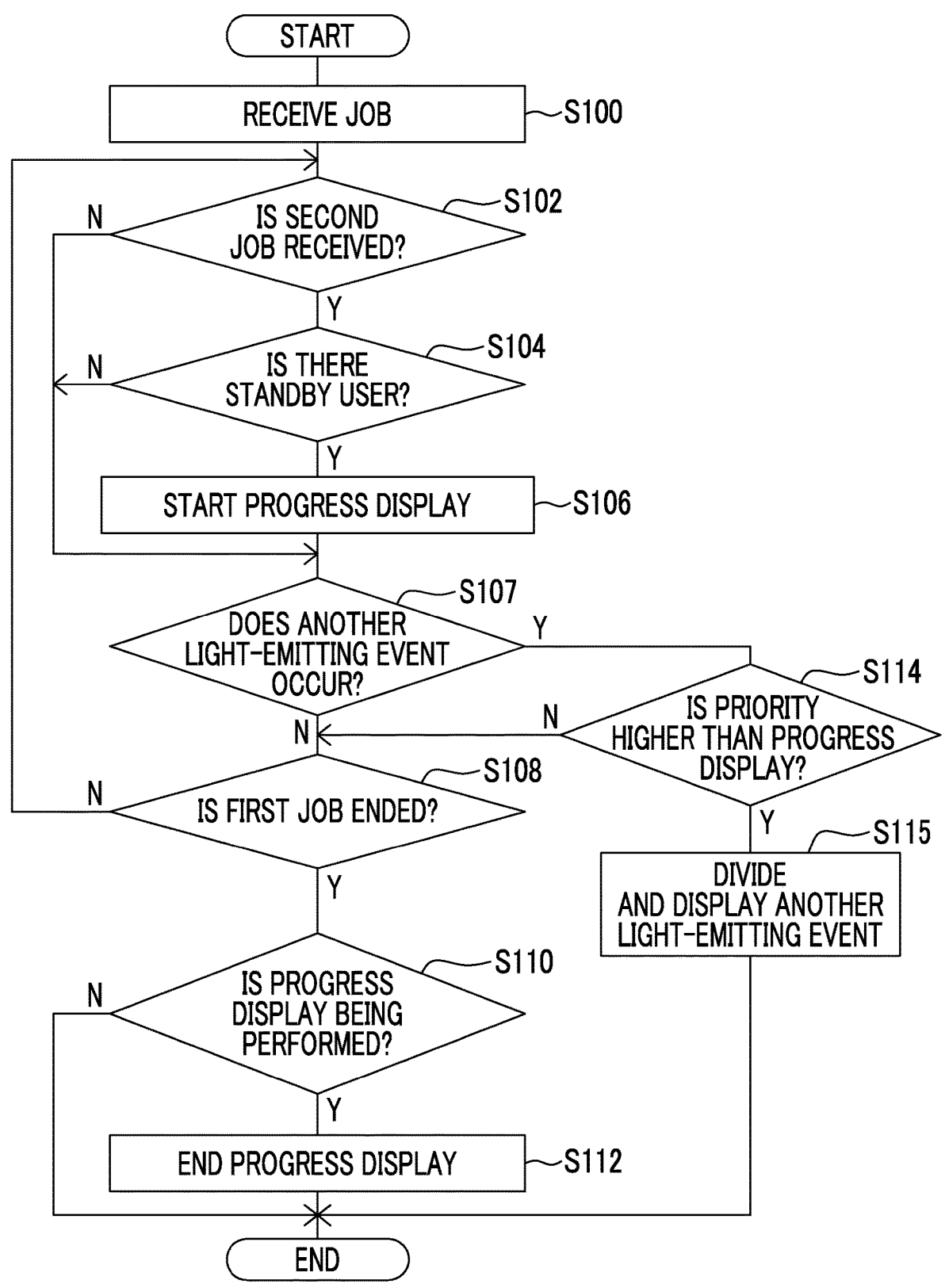
FIG. 11 is a flowchart illustrating an example of a flow of processing performed by the information processing apparatus in a second modification example.

FIG. 11 is a flowchart illustrating an example of a flow of processing performed by the information processing apparatus 10 in the second modification example. The processing of FIG. 11 is started in a case where the user of the image forming apparatus 12 transmits a job. The processing identical to the processing of FIGS. 6 and 8 will be described with the identical reference numeral.

In step S100, the host CPU 14 receives the job and proceeds to step S102.

In step S102, the host CPU 14 determines whether or not a second job is received. The host CPU proceeds to step S104 in a case where the determination is positive, and proceeds to step S107 in a case where the determination is negative.

In step S104, the host CPU 14 determines whether or not there is the standby user. This determination is performed by acquiring the detection result of the user detection unit 42 and determining whether or not a user other than the user who is operating the image forming apparatus 12 is detected. The host CPU proceeds to step S106 in a case where the determination is positive, and proceeds to step S107 in a case where the determination is negative.

In step S106, the host CPU 14 starts the progress display of the processing of the image forming apparatus 12 by controlling the light emitter drive unit 26 to cause the light emitter 38 to emit light, and proceeds to step S107. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S107, the host CPU 14 determines whether or not another light-emitting event occurs. The host CPU proceeds to step S108 in a case where the determination is negative, and proceeds to step S114 in a case where the determination is positive.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

On the other hand, in step S114, the host CPU 14 determines whether or not the occurred another light-emitting event has a higher priority than the progress display. The host CPU proceeds to step S108 in a case where the determination is negative, and proceeds to step S115 in a case where the determination is positive.

In step S115, the host CPU 14 divides and displays that another light-emitting event occurs by controlling the light emitter drive unit 26 to cause the light emitter 38 to emit light, and ends the series of processing. For example, as illustrated in FIGS. 9 and 10, another light-emitting event is displayed while the progress display is performed by displaying the progress information in the display region a and displaying another light-emitting event in the display region b.

Third Modification Example

Next, a third modification example of the processing of performing the display by the light emitter 38 performed by the information processing apparatus 10 according to the present exemplary embodiment will be described.

The third modification example is an example in which the progress display is not performed under a predetermined specific condition even though the standby user is detected. Specifically, as the specific condition, in a case where the waiting time is short, such as in a case where the number of printed sheets is small, the progress display is not performed. For example, in a case where the number of printed sheets is less than or equal to a predetermined number such as 3, the progress display is not performed, and in a case where the number of printed sheets is greater than 3, the progress display of processing is performed by causing the light emitter 38 to emit light.

Figure 12:
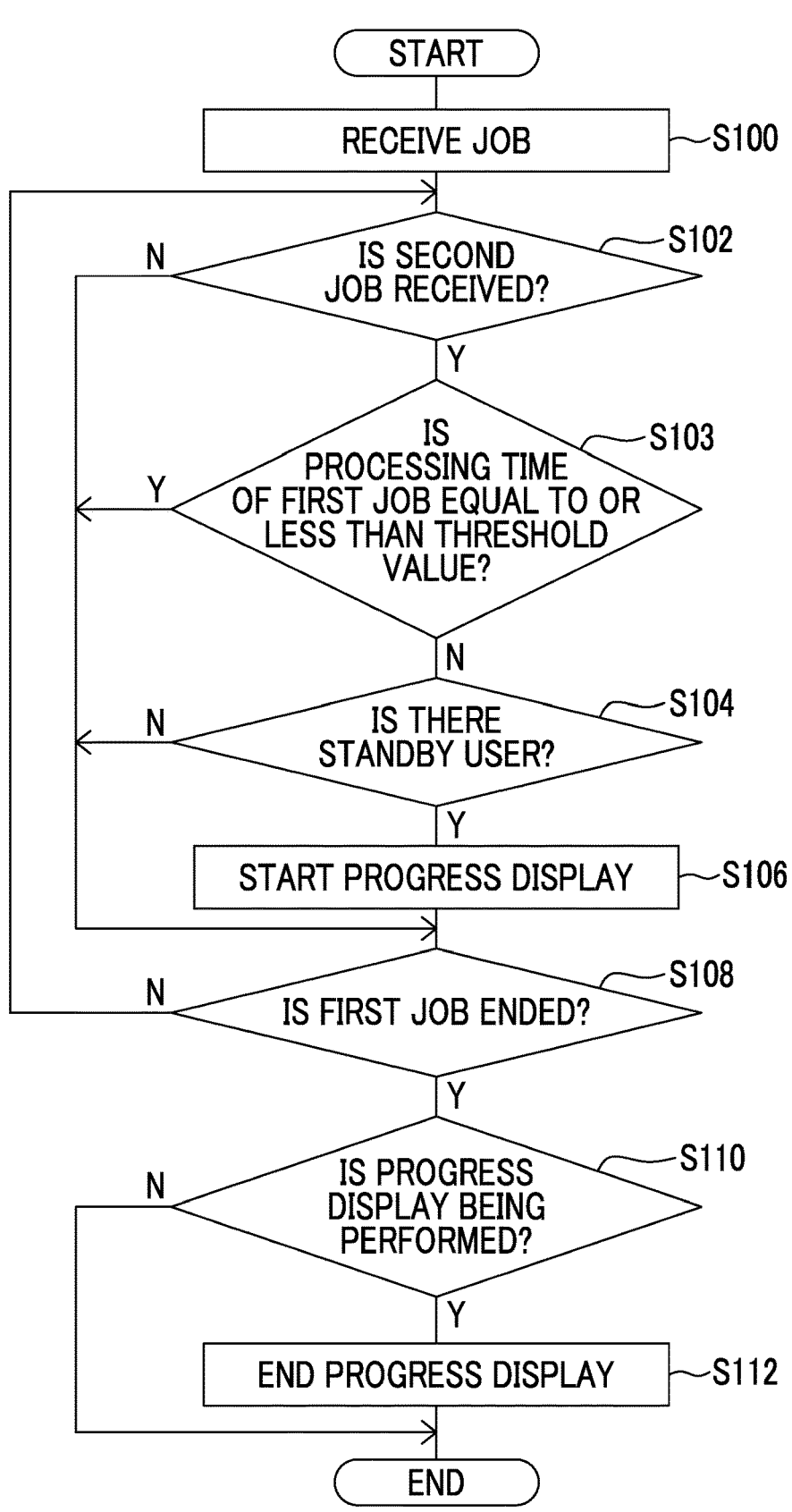
FIG. 12 is a flowchart illustrating an example of a flow of processing performed by the information processing apparatus in a third modification example.

FIG. 12 is a flowchart illustrating an example of a flow of processing performed by the information processing apparatus 10 in the third modification example. The processing of FIG. 12 is started in a case where the user of the image forming apparatus 12 transmits a job. The processing identical to the processing of FIG. 6 will be described with the identical reference numeral.

In step S100, the host CPU 14 receives the job and proceeds to step S102.

In step S102, the host CPU 14 determines whether or not a second job is received. The host CPU proceeds to step S103 in a case where the determination is positive, and proceeds to step S108 in a case where the determination is negative.

In step S103, the host CPU 14 determines whether or not a processing time of the first job is equal to or shorter than a predetermined threshold value. The determination is, for example, whether or not the number of printed sheets is equal to or less than a predetermined number of sheets. The host CPU proceeds to step S104 in a case where the determination is negative, and proceeds to step S108 in a case where the determination is positive.

In step S104, the host CPU 14 determines whether or not there is the standby user. This determination is performed by acquiring the detection result of the user detection unit 42 and determining whether or not a user other than the user who is operating the image forming apparatus 12 is detected. The host CPU proceeds to step S106 in a case where the determination is positive, and proceeds to step S107 in a case where the determination is negative.

In step S106, the host CPU 14 starts the progress display of the processing of the image forming apparatus 12 by controlling the light emitter drive unit 26 to cause the light emitter 38 to emit light, and proceeds to step S108. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

Fourth Modification Example

Next, a fourth modification example of the processing of performing the display by the light emitter 38 performed by the information processing apparatus 10 according to the present exemplary embodiment will be described.

The fourth modification example is another example in which the progress display is not performed under a predetermined specific condition even though the standby user is detected. Specifically, in a case where the user who is operating is executing a scanning job as an example of the specific condition, since the waiting time can be visually grasped by the amount of sheets being scanned, the progress display is not performed.

Figure 13:
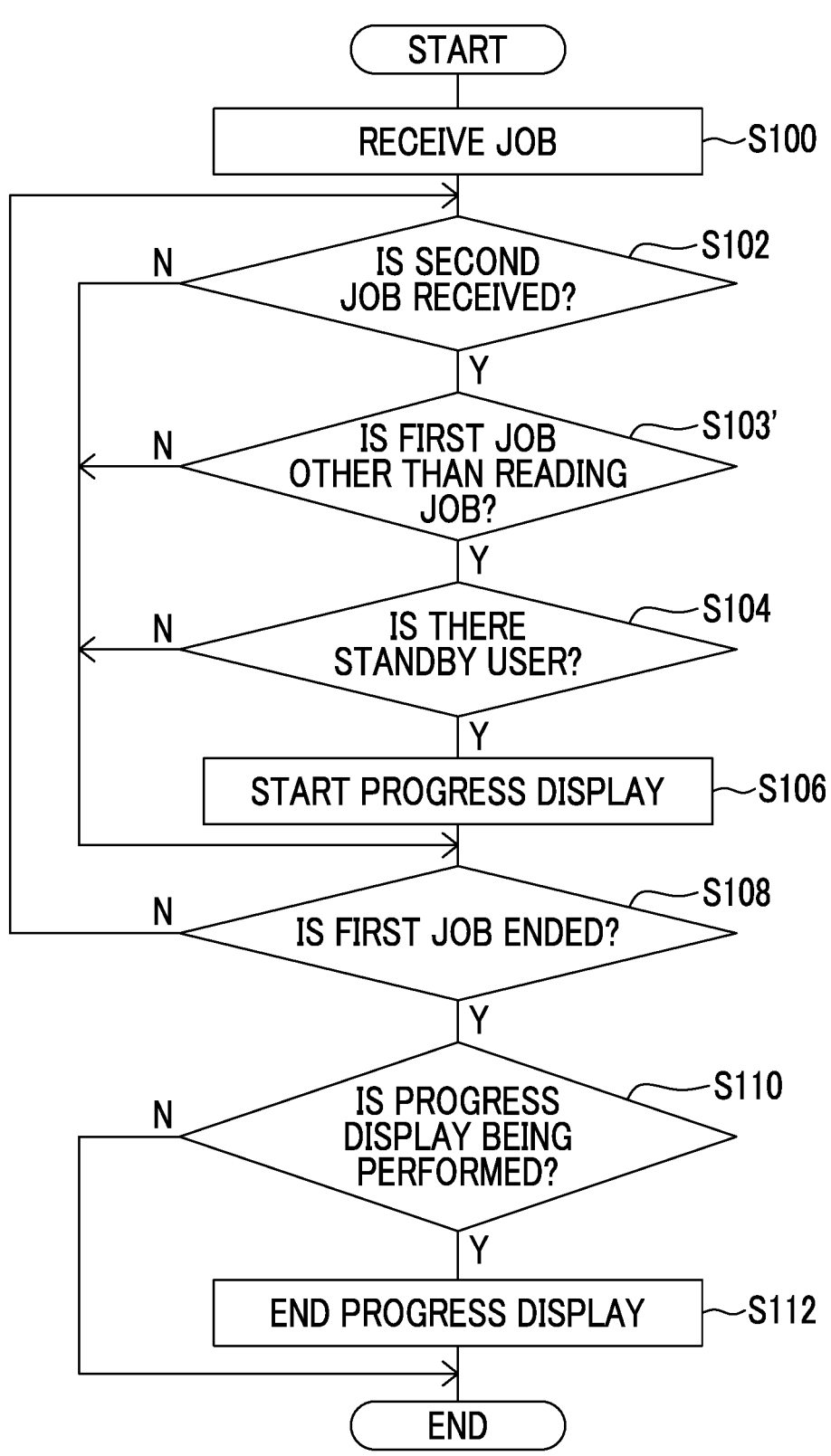
FIG. 13 is a flowchart illustrating an example of a flow of processing performed by the information processing apparatus in a fourth modification example.

FIG. 13 is a flowchart illustrating an example of a flow of processing performed by the information processing apparatus 10 in the fourth modification example. The processing of FIG. 13 is started in a case where the user of the image forming apparatus 12 transmits a job. The processing identical to the processing of FIG. 6 will be described with the identical reference numeral.

In step S100, the host CPU 14 receives the job and proceeds to step S102.

In step S102, the host CPU 14 determines whether or not a second job is received. The host CPU proceeds to step S103' in a case where the determination is positive, and proceeds to step S108 in a case where the determination is negative.

In step S103', the host CPU 14 determines whether or not the first job is a job other than the scanning job. The host CPU proceeds to step S104 in a case where the determination is positive, and proceeds to step S107 in a case where the determination is negative.

In step S104, the host CPU 14 determines whether or not there is the standby user. This determination is performed by acquiring the detection result of the user detection unit 42 and determining whether or not a user other than the user who is operating the image forming apparatus 12 is detected. The host CPU proceeds to step S106 in a case where the determination is positive, and proceeds to step S107 in a case where the determination is negative.

In step S106, the host CPU 14 starts the progress display of the processing of the image forming apparatus 12 by controlling the light emitter drive unit 26 to cause the light emitter 38 to emit light, and proceeds to step S108. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

The specific conditions in the third modification example and the fourth modification example are not limited to the above conditions, and other specific conditions may be applied. For example, a case where a predicted print end time is equal to or less than a predetermined threshold value may be applied as the specific condition. Alternatively, a case where it is known that the standby user is performing another operation may be applied. Specifically, in a case where the approach is detected by Bluetooth (registered trademark), the user detection unit detects that the standby user performs another operation by transmitting information such as being on a screen where the job is being set to the image forming apparatus 12 together.

Fifth Modification Example

Next, a fifth modification example of the processing of performing the display by the light emitter 38 performed by the information processing apparatus 10 according to the present exemplary embodiment will be described.

Figure 14:
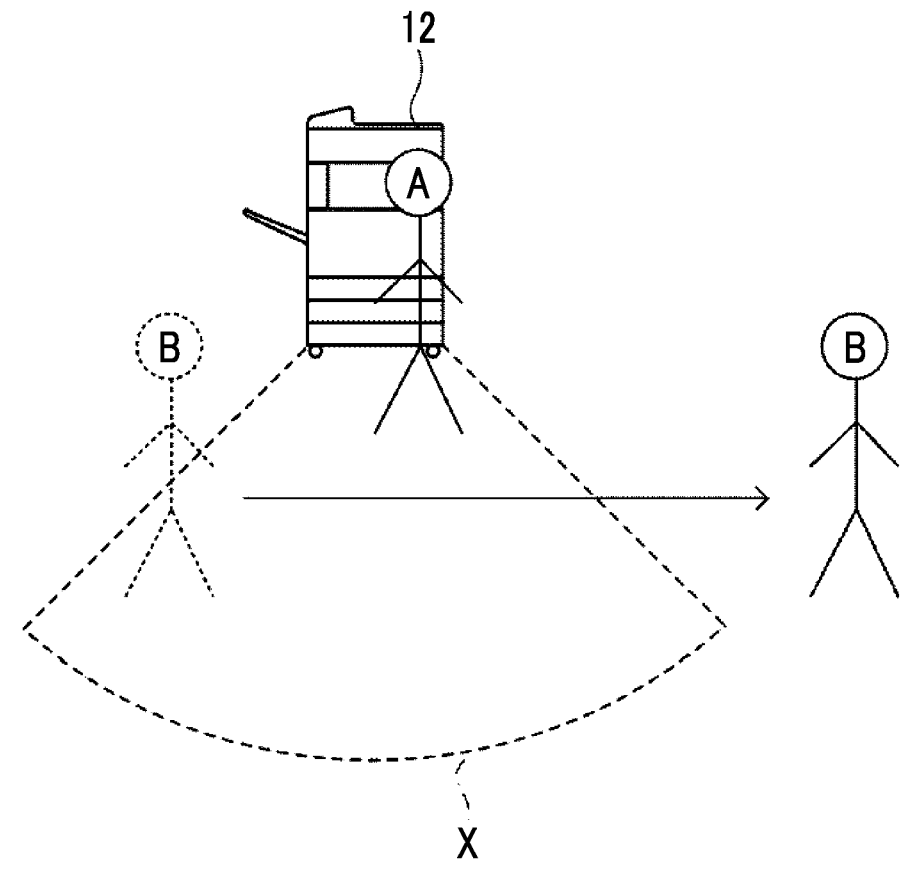
FIG. 14 is a diagram illustrating detection states of users of the image forming apparatus 12, and is the diagram illustrating a case in which a user B having a high possibility of using the image forming apparatus 12 moves out of a detection range X of the user detection unit 42.

In the fifth modification example, even though it is assumed that there is the standby user having the possibility of using the image forming apparatus 12 other than the user who is operating, thereafter, the progress display is canceled in a case where the standby user is out of the detection range X of the user detection unit 42. For example, as illustrated in FIG. 14, even though the user detection unit 42 detects the user B while the user A is using the image forming apparatus 12, thereafter, the progress display is stopped in a case where the user B moves and moves out of the detection range X of the user detection unit 42. FIG. 14 is a diagram illustrating the detection state of the user of the image forming apparatus 12, and illustrates a case where the user B having the high possibility of using the image forming apparatus 12 moves out of the detection range X of the user detection unit 42.

Figure 15:
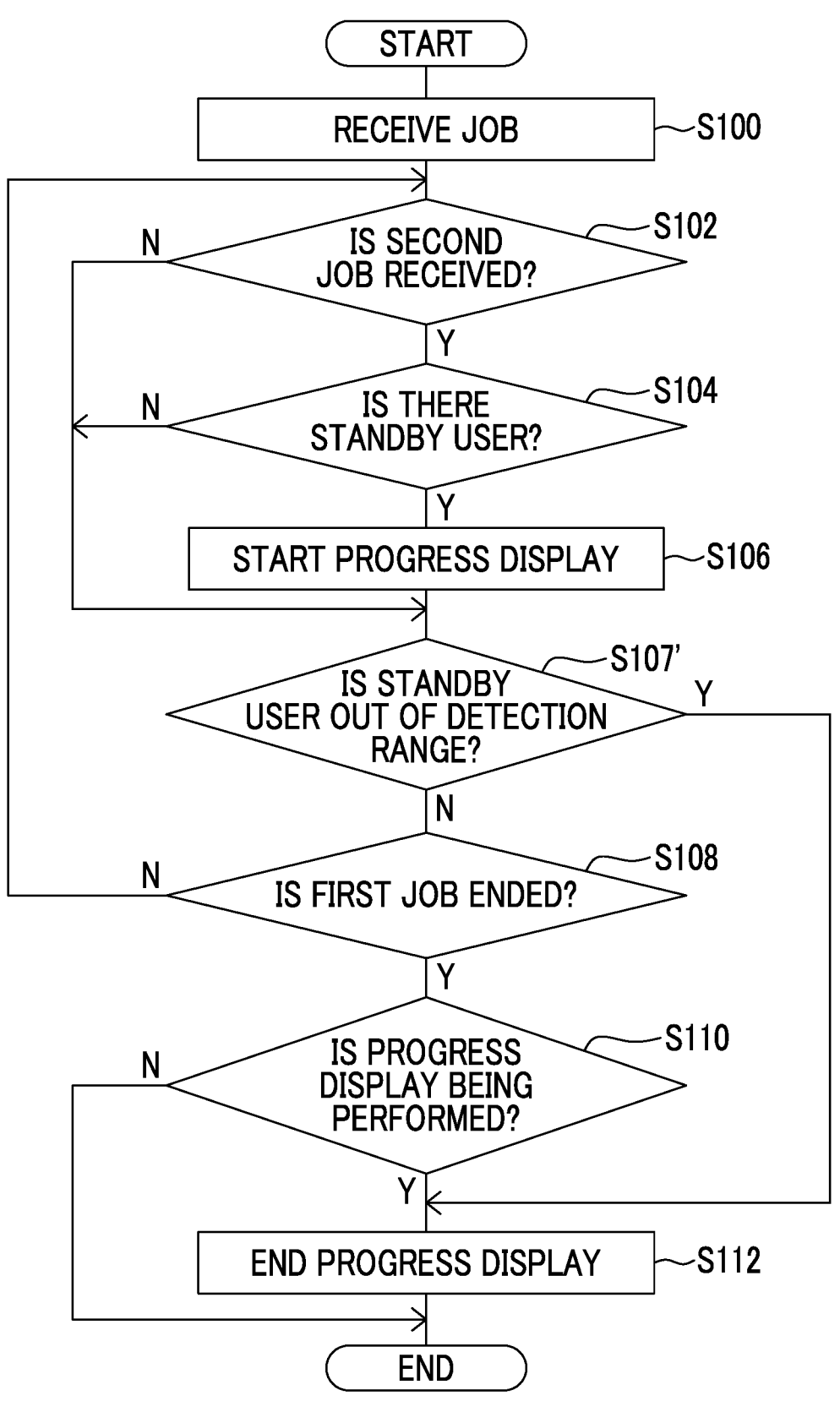
FIG. 15 is a flowchart illustrating an example of a flow of processing performed by the information processing apparatus in a fifth modification example.

FIG. 15 is a flowchart illustrating an example of a flow of processing performed by the information processing apparatus 10 in the fifth modification example. The processing of FIG. 15 is started in a case where the user of the image forming apparatus 12 transmits a job. The processing identical to the processing of FIG. 6 will be described with the identical reference numeral.

In step S100, the host CPU 14 receives the job and proceeds to step S102.

In step S102, the host CPU 14 determines whether or not a second job is received. The host CPU proceeds to step S104 in a case where the determination is positive, and proceeds to step S107' in a case where the determination is negative.

In step S104, the host CPU 14 determines whether or not there is the standby user. This determination is performed by acquiring the detection result of the user detection unit 42 and determining whether or not a user other than the user who is operating the image forming apparatus 12 is detected. The host CPU proceeds to step S106 in a case where the determination is positive, and proceeds to step S107' in a case where the determination is negative.

In step S106, the host CPU 14 starts the progress display of the processing of the image forming apparatus 12 by controlling the light emitter drive unit 26 to cause the light emitter 38 to emit light, and proceeds to step S107'. In other words, only in a case where the second user having the possibility of using the image forming apparatus 12 other than the first user who is operating the image forming apparatus 12 is detected, display corresponding to the progress of the processing accepted by the image forming apparatus 12 is performed, and thus, a waiting time is notified.

In step S107', the host CPU 14 determines whether or not the standby user is out of the detection range X of the user detection unit 42. The host CPU proceeds to step S108 in a case where the determination is negative, and proceeds to step S112 in a case where the determination is positive.

In step S108, the host CPU 14 determines whether or not a first job is ended. The host CPU returns to step S102 to repeat the above processing in a case where the determination is negative, and proceeds to step S110 in a case where the determination is positive.

In step S110, the host CPU 14 determines whether or not the progress display is being performed. The host CPU proceeds to step S112 in a case where the determination is positive, and ends the series of processing in a case where the determination is negative.

In step S112, the host CPU 14 ends the progress display and ends the series of processing. That is, the host CPU 14 controls the light emitter drive unit 26 to turn off the light emitter 38.

The above first to fifth modification examples may be combined as appropriate. For example, in each of the first to fourth modification examples, the progress display may be ended in a case where the standby user moves out of the detection range X of the user detection unit 42, as in the fifth modification example.

In the above exemplary embodiment, although the example in which the progress display of the processing of the image forming apparatus 12 is performed by causing the light emitter 38 to emit light, the progress display of the processing may be performed by a method other than light emission of the light emitter 38. For example, a display unit for displaying a progress situation may be provided to display the progress situation. As an example in which the progress display is performed, although a mode in which display is performed in a location different from the display panel 36 or the touch panel 34 on which the user of the image forming apparatus 12 confirms display or performs an operation, such as the light emitter 38 or the display unit for displaying the progress situation has been described, the present disclosure is not limited thereto. For example, the progress may be displayed on the display panel 36 for the standby user. In this case, the display panel 36 is positioned, for example, above the image forming apparatus 12 such that the contents can be seen by the standby user. In a case where the display panel 36 or the like is different from a member that performs the progress display, necessary information may be displayed separately.

In the above exemplary embodiment, although the example in which the information processing apparatus 10 is provided in the image forming apparatus 12 has been described, the present disclosure is not limited thereto. For example, the information processing apparatus may be provided in another apparatus such as an image processing apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the information processing apparatus 10 according to the above exemplary embodiment may be processing performed by software, processing performed by hardware, or processing in which both the software and the hardware are combined. The processing performed by the information processing apparatus 10 may be stored in a storage medium as a program and distributed.

The present disclosure is not limited to the above description, and it is needless to say that the present disclosure may be variously modified and implemented within a range not deviating from the gist thereof.

The following additional appendices are disclosed regarding the above exemplary embodiment.

(((1)))

An information processing apparatus comprising a processor configured to perform display corresponding to progress of processing accepted by an image forming apparatus only in a case where a second user having a possibility of using the image forming apparatus other than a first user who is operating an operation panel is detected.

(((2)))

The information processing apparatus according to (((1))), wherein the processor is configured to acquire a detection result from a detection unit that detects the second user.

(((3)))

The information processing apparatus according to (((2))), wherein the detection unit detects the second user by at least one of a motion detector or a camera.

(((4)))

The information processing apparatus according to (((2))), wherein the detection unit detects an approach of the second user by detecting an operation of a mobile terminal carried by the second user or an approach of the mobile terminal.

(((5)))

The information processing apparatus according to (((2))), wherein the processor is configured to set the display corresponding to the progress to be non-display in a case where the second user is not detected by the detection unit.

(((6)))

The information processing apparatus according to any one of (((1))) to (((5))), wherein the processor is configured to preferentially display a display event of which a priority is higher than a predetermined priority in a case where another display event is detected during the display corresponding to the progress.

(((7)))

The information processing apparatus according to any one of (((1))) to (((5))), wherein the processor is configured to divide a display region, and display the display corresponding to the progress and another display event in parallel in a case where the other display event is detected during the display corresponding to the progress.

(((8)))

The information processing apparatus according to any one of (((1))) to (((7))), wherein the processor is configured to set the display corresponding to the progress to be non-display under a predetermined specific condition even though the second user is detected.

(((9)))

The information processing apparatus according to (((8))), wherein the processor is configured to set the display corresponding to the progress to be non-display in a case where a processing amount as a situation of the progress is smaller than a predetermined threshold value.

(((10)))

The information processing apparatus according to (((8))), wherein the processor is configured to set the display corresponding to the progress to be non-display in a case where a user who is operating uses a scanning function of the image forming apparatus.

(((11)))

The information processing apparatus according to any one of (((1))) to (((10))), wherein the processor is configured to divide and display a display region in a case where display corresponding to additional information is performed in addition to the display corresponding to the progress.

(((12)))

The information processing apparatus according to any one of (((1))) to (((11))), wherein the processor is configured to set the display corresponding to the progress to be non-display in a case where the second user is not detected.

(((13)))

An information processing program causing a computer to execute a process comprising performing display corresponding to progress of processing accepted by an image forming apparatus only in a case where a second user having a possibility of using the image forming apparatus other than a first user who is operating an operation panel is detected.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
detect a second user having a possibility of using an image forming apparatus within a detection range from the image forming apparatus while a first user who is operating an operation panel of the image forming apparatus;
perform display indicating an elapsed time of processing accepted by the image forming apparatus as a notification to the second user of a waiting time only in response to the second user having the possibility of using the image forming apparatus other than the first user is detected; and
not display the notification to the second user of the waiting time in response to a determination of the second user not being detected within the detection range,
wherein the display indicating the elapsed time of the processing as the notification to the second user of the waiting time accepted by the image formation apparatus includes a plurality of light emitters arranged in a row in a vicinity and outside of a touch panel operation unit, wherein an amount of time for finishing the processing is represented by a number of the light emitters associated with a plurality of jobs, and different processing accepted by the image forming apparatus are represented by different colors associated with different jobs.

2. The information processing apparatus according to claim 1, wherein the processor is configured to:
acquire a detection result from a detection unit that detects the second user, wherein the detection unit comprises at least one of a motion detector or a camera and detects the second user.

3. The information processing apparatus according to claim 2,
    wherein the detection unit detects an approach of the second user by detecting an operation of a mobile terminal carried by the second user or an approach of the mobile terminal.

4. The information processing apparatus according to claim 2, wherein the processor is configured to:
    set the display corresponding to the progress to be non-display in a case where the second user is not detected by the detection unit.

5. The information processing apparatus according to claim 1, wherein the processor is configured to:
    preferentially display a display event of which a priority is higher than a predetermined priority in a case where another display event is detected during the display corresponding to the progress.

6. The information processing apparatus according to claim 1, wherein the processor is configured to:
    divide a display region, and display the display corresponding to the progress and another display event in parallel in a case where the other display event is detected during the display corresponding to the progress.

7. The information processing apparatus according to claim 1, wherein the processor is configured to:
    set the display corresponding to the progress to be non-display under a predetermined specific condition even though the second user is detected.

8. The information processing apparatus according to claim 7, wherein the processor is configured to:
    set the display corresponding to the progress to be non-display in a case where a processing amount as a situation of the progress is smaller than a predetermined threshold value.

9. The information processing apparatus according to claim 7, wherein the processor is configured to:
    set the display corresponding to the progress to be non-display in a case where a user who is operating uses a scanning function of the image forming apparatus.

10. The information processing apparatus according to claim 1, wherein the processor is configured to:
    divide and display a display region in a case where display corresponding to additional information is performed in addition to the display corresponding to the progress.

11. The information processing apparatus according to claim 1, wherein the processor is configured to:
    set the display corresponding to the progress to be non-display in a case where the second user is not detected.

12. A non-transitory computer readable medium storing an information processing program causing a computer to execute a process comprising:

detecting a second user having a possibility of using an image forming apparatus within a detection range from the image forming apparatus while a first user who is operating an operation panel of the image forming apparatus;

performing display indicating an elapsed time of processing accepted by the image forming apparatus as a notification to the second user of a waiting time only in response to the second user having the possibility of using the image forming apparatus other than the first user is detected; and not displaying the notification to the second user of the waiting time in response to a determination of the second user not being detected within the detection range, wherein the display indicating the elapsed time of the processing as the notification to the second user of the waiting time accepted by the image formation apparatus includes a plurality of light emitters arranged in a row in a vicinity and outside of a touch panel operation unit, wherein an amount of time for finishing the processing is represented by a number of the light emitters associated with a plurality of jobs, and different processing accepted by the image forming apparatus are represented by different colors associated with different jobs.

13. An information processing method comprising:

detecting a second user having a possibility of using an image forming apparatus within a detection range from the image forming apparatus while a first user who is operating an operation panel of the image forming apparatus;

performing display indicating an elapsed time of processing accepted by the image forming apparatus as a notification to the second user of a waiting time only in response to the second user having the possibility of using the image forming apparatus other than the first user is detected; and not displaying the notification to the second user of the waiting time in response to a determination of the second user not being detected within the detection range, wherein the display indicating the elapsed time of the processing as the notification to the second user of the waiting time accepted by the image formation apparatus includes a plurality of light emitters arranged in a row in a vicinity and outside of a touch panel operation unit, wherein an amount of time for finishing the processing is represented by a number of the light emitters associated with a plurality of jobs, and different processing accepted by the image forming apparatus are represented by different colors associated with different jobs.

*    *    *    *    *